United States Patent
Lee et al.

(10) Patent No.: US 8,442,359 B2
(45) Date of Patent: May 14, 2013

(54) IMAGE INTERPOLATION METHOD AND APPARATUS USING REFERENCE BLOCK BASED ON DIRECTION

(75) Inventors: Ho Jin Lee, Seoul (KR); Young Su Moon, Seoul (KR); Shi Hwa Lee, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 338 days.

(21) Appl. No.: 12/923,078

(22) Filed: Aug. 31, 2010

(65) Prior Publication Data

US 2011/0116714 A1 May 19, 2011

(30) Foreign Application Priority Data

Nov. 18, 2009 (KR) .................. 10-2009-0111249

(51) Int. Cl.
*G06K 9/32* (2006.01)
*G06K 9/00* (2006.01)

(52) U.S. Cl.
USPC ........................................ 382/300

(58) Field of Classification Search ............. 382/162, 382/167, 268, 298–300; 348/222.1, 234, 348/237, 241, 252, 253, 272, 273, 277, 416, 348/458; 375/240
See application file for complete search history.

(56) References Cited

U.S. PATENT DOCUMENTS

| | | | | |
|---|---|---|---|---|
| 5,936,672 A | * | 8/1999 | Ahnn | 375/240.17 |
| 6,154,491 A | * | 11/2000 | Uetani | 375/240.16 |
| 7,379,098 B2 | | 5/2008 | Yamamoto et al. | |
| 7,489,361 B2 | * | 2/2009 | Matsuzaki et al. | 348/458 |
| 2011/0116714 A1 | * | 5/2011 | Lee et al. | 382/167 |

FOREIGN PATENT DOCUMENTS

| | | |
|---|---|---|
| JP | 2006-135919 | 5/2006 |
| JP | 2009-55281 | 3/2009 |
| JP | 2009-164778 | 7/2009 |
| KR | 10-2007-0048904 | 5/2007 |
| KR | 10-2009-0013047 | 2/2009 |
| KR | 10-2009-0020918 | 2/2009 |

* cited by examiner

Primary Examiner — Amir Alavi
(74) Attorney, Agent, or Firm — Staas & Halsey LLP (57) ABSTRACT

Provided is an image interpolation method and apparatus using a reference block depending on a direction. The image interpolation method may generate a horizontal reference block and a vertical reference block each with respect to an inputted image, and determine interpolation directivity with respect to the inputted image using the generated horizontal reference block and vertical reference block, thereby performing an interpolation on an image based on accurate interpolation directivity. In particular, the image interpolation method may determine whether to verify interpolation directivity depending on an edge intensity of an inputted image, thereby performing a color filter array (CFA) interpolation on an image based on an edge direction without determining the interpolation directivity, when the edge intensity is strong.

19 Claims, 8 Drawing Sheets

FIG. 6 ously utilized in the CFA interpolation algorithm, a defect such as zipper artifact may occur. Also, when the high spectral correlation characteristic is not appropriately utilized in the CFA interpolation algorithm, a defect such as false color may occur.

IMAGE INTERPOLATION METHOD AND APPARATUS USING REFERENCE BLOCK BASED ON DIRECTION

CROSS-REFERENCE TO RELATED APPLICATIONS

This application claims the priority benefit of Korean Patent Application No. 10-2009-0111249, filed on Nov. 18, 2009, in the Korean Intellectual Property Office, the disclosure of which is incorporated herein by reference.

BACKGROUND

1. Field

One or more embodiments relate to a technology for interpolating images using a reference block depending on a direction.

2. Description of the Related Art

In currently commercialized digital cameras, an image sensor including a color filter array (hereinafter, referred to as "CFA") and an I-plane optical sensor may be used. The CFA arranged in a Bayer pattern type may filter lights to enable only one signal of red (R), green (G), and blue (B) color elements to form in a single pixel.

In this manner, a process of restoring an RGB (red, green, and blue) full color image, that is, three pieces of R/G/B from the 1-plane image obtained in the Bayer pattern type may be referred to as a CFA interpolation algorithm or a CFA demosaicing algorithm. In general, a local area of images may have a high spatial correlation characteristic and a high spectral correlation characteristic, which are utilized in the CFA interpolation algorithm. However, when the high spatial correlation characteristic is not appropriately utilized in the CFA interpolation algorithm, a defect such as zipper artifact may occur. Also, when the high spectral correlation characteristic is not appropriately utilized in the CFA interpolation algorithm, a defect such as false color may occur.

For example, in a case of an image including a high frequency image signal such as an edge, defects such as the zipper artifact, the false color, and the like may be easily induced. That is, when an interpolation is performed in a direction that does not conform to an edge direction, the above described defects may frequently occur.

Accordingly, accurately estimating interpolation directivity by utilizing the above described two characteristics of the local area may be a necessary condition for a high quality CFA interpolation.

SUMMARY

According to an aspect of one or more embodiments, there may be provided an image interpolation method, including: generating a horizontal reference block for an inputted image; generating a vertical reference block for the inputted image; and determining interpolation directivity for the inputted image using the generated horizontal reference block and vertical reference block, wherein the method may be performed using at least one processor.

The generating of the horizontal reference block may include: designating a reference block from the inputted image; calculating a horizontal compensation value for each row of the designated reference block; calculating a horizontal reference value by adding the calculated horizontal compensation value and an original pixel value; and generating the horizontal reference block by enabling the calculated horizontal reference value to correspond to the reference block.

Also, the calculating of the horizontal compensation value may include: calculating a horizontal interpolation value by performing a temporary interpolation on the designated reference block in a horizontal direction; calculating an average between the calculated horizontal interpolation value for each row of the reference block and the original pixel value; and designating the calculated average as the horizontal compensation value for each row of the reference block.

Also, the image interpolation method may further include: calculating a difference value between the horizontal interpolation value of the reference block and a horizontal reference value of the horizontal reference block corresponding to the horizontal interpolation value; summing-up an absolute value of the calculated difference value for all pixels of the horizontal reference block; and designating the summed-up result value as a horizontal dissimilarity value.

Also, the generating of the vertical reference block may include: designating a reference block from the inputted image; calculating a vertical compensation value for each column of the designated reference block; calculating a vertical reference value by adding the calculated vertical compensation value and an original pixel value; and generating the vertical reference block by enabling the calculated vertical reference value to correspond to the reference block.

Also, the calculating of the vertical compensation value may include: calculating a vertical interpolation value by performing a temporary interpolation on the designated reference block in a vertical direction; calculating an average between the calculated horizontal interpolation value for each column of the reference block and the original pixel value; and designating the calculated average as the vertical compensation value for each column of the reference block.

Also, the image interpolation method may further include: calculating a difference value between the vertical interpolation value of the reference block and a vertical reference value of the vertical reference block corresponding to the vertical interpolation value; summing-up an absolute value of the calculated difference value for all pixels of the vertical reference block; and designating the summed-up result value as a vertical dissimilarity value.

Also, the determining of the interpolation directional property may include: calculating a horizontal dissimilarity value using the generated horizontal reference block; calculating a vertical dissimilarity value using the generated vertical reference block; and determining, as the interpolation directivity, a direction having a smallest dissimilarity value from among the horizontal dissimilarity value and the vertical dissimilarity value.

Also, the image interpolation method may further include performing a color filter array (CFA) interpolation on the inputted image in accordance with the determined interpolation directivity.

According to another aspect of one or more embodiments, there may be provided an image interpolation method, including: determining whether to verify interpolation directivity depending on an edge intensity of an inputted image; calculating a degree of direction dissimilarity of a reference block when being determined to verify the interpolation directivity; and predicting the interpolation directivity for the inputted image based on the direction of direction dissimilarity of the reference block, wherein the method may be performed using at least one processor.

According to still another aspect of one or more embodiments, there may be provided an image interpolation apparatus, including: an edge intensity verifying unit to verify an edge intensity of an inputted image; a reference block generating unit to generate a horizontal reference block and a vertical reference block for the inputted image based on the verified result; and an interpolation directivity determining unit to determine an interpolation directivity for the inputted image using the generated horizontal reference block and vertical direction reference block using at least one processor.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
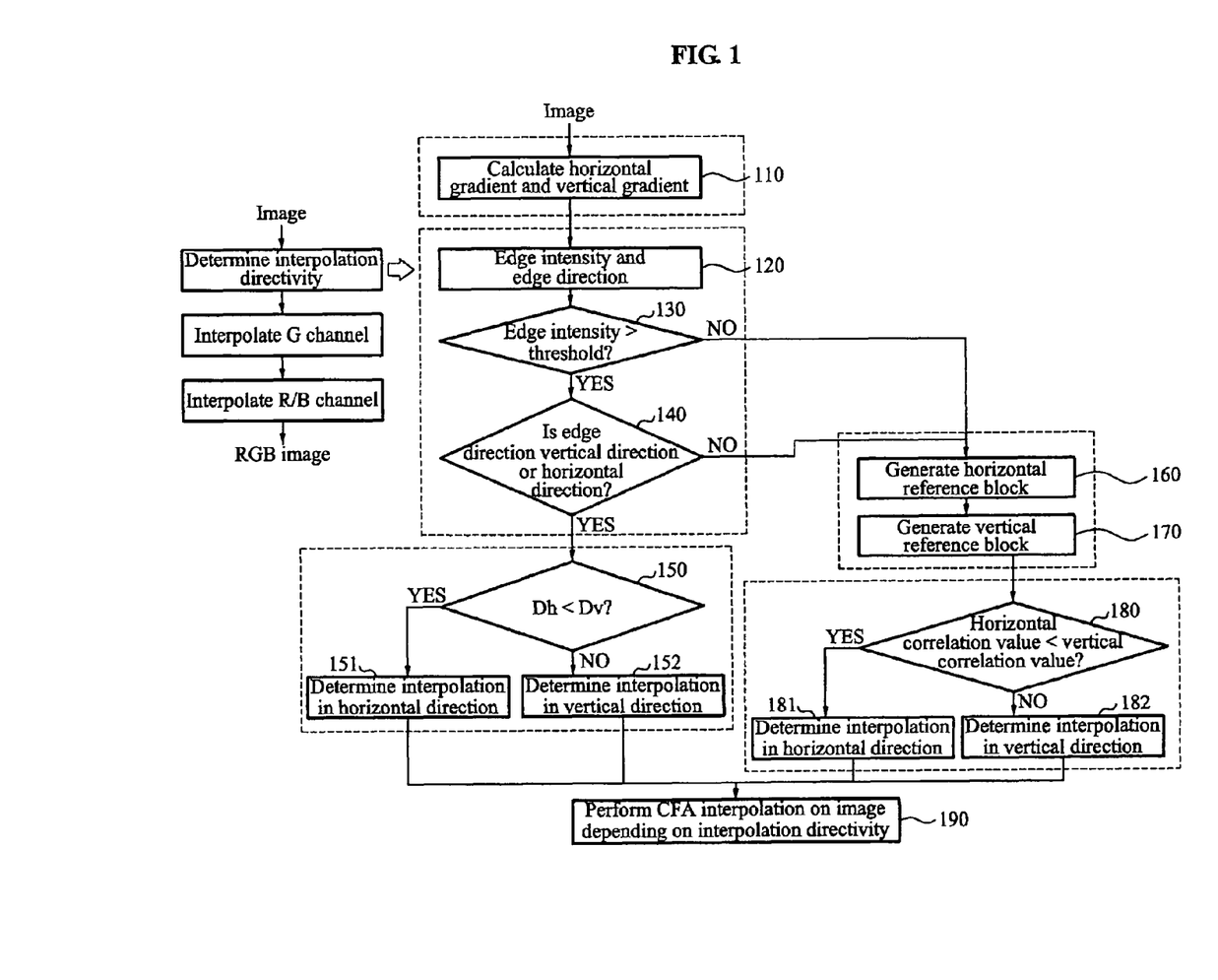
FIG. 1 is a flowchart illustrating an image interpolation method according to an embodiment.

FIG. 1 is a flowchart illustrating an image interpolation method according to an embodiment.

In operation 110, the image interpolation method may calculate a horizontal gradient and a vertical gradient with respect to an inputted image (for an inputted image) (Bayer pattern image).

In operation 120, the image interpolation method may calculate an edge intensity and an edge direction each with respect to the inputted image (for the inputted image).

When the calculated edge intensity is greater than a predetermined threshold in operation 130, the image interpolation method may determine whether the edge direction is a vertical direction or a horizontal direction in operation 140, and may determine interpolation directivity in the vertical direction or the horizontal direction based on the determined result in operations 150, 151, and 152. That is, when the edge intensity is greater than the threshold, since the edge intensity is relatively strong, an interpolation may be performed depending on the edge direction without determining the interpolation directivity.

However, when the edge intensity is less than the threshold, the image interpolation method may need to more accurately predict the interpolation directivity. Accordingly, in operations 160 and 170, the image interpolation method may generate a horizontal reference block and a vertical reference block.

Hereinafter, an example of generating the horizontal reference block and the vertical reference block will be described with reference to FIGS. 2 and 3.

Example of Generating Horizontal (H) Reference Block

Figure 2:
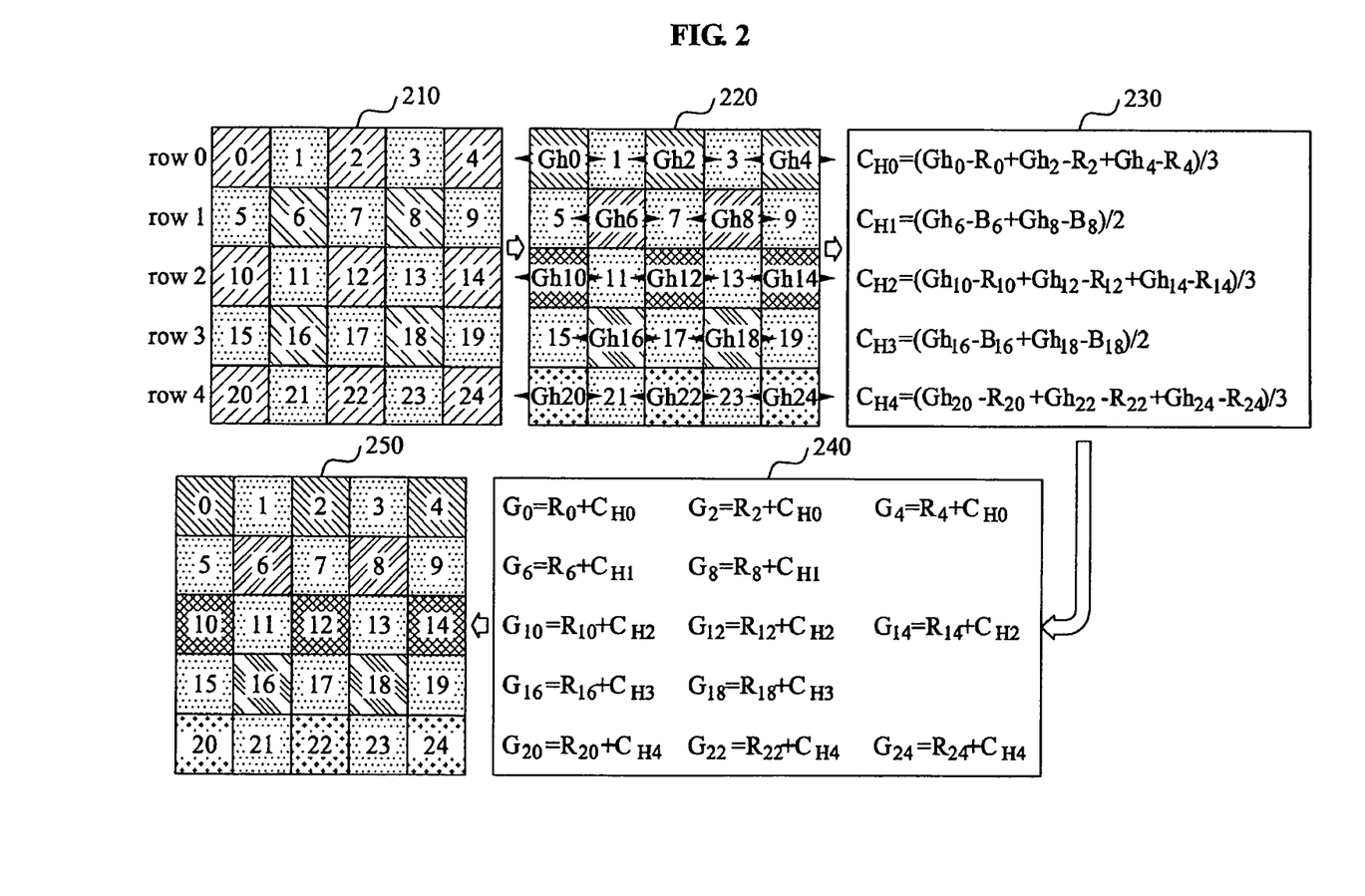
FIG. 2 illustrates an example of generating a horizontal reference block according to an embodiment.

FIG. 2 illustrates an example of generating a horizontal reference block according to an embodiment.

Referring to FIG. 2, the image interpolation method may designate a reference block 210 from the inputted image. For example, the reference block 210 may be a 5*5 block, and each of 25 pixels of the reference block 210 has an independent pixel value.

In operation 220, the image interpolation method may perform a temporary interpolation on the reference block 210 in a horizontal direction to calculate horizontal interpolation values $Gh_0$, $Gh_1$, $Gh_2$, ..., and $Gh_{24}$. In this instance, the image interpolation method may perform a temporary interpolation on a green (G) channel, a red (R) channel, and a blue (B) channel. Herein, for convenience of descriptions, an example of performing a temporary interpolation on the G channel in a horizontal direction to generate a horizontal reference block with respect to the G channel (for the G channel) will be described.

Next, in operation 230, the image interpolation method may calculate, as horizontal compensation values $C_{H0}$, $C_{H1}$, $C_{H2}$, $C_{H3}$, and $C_{H4}$ for each row, an average between the calculated horizontal interpolation values (Gh) and original pixel values (R or B) for each row of row 0, row 1, row 2, row 3, and row 4 of the reference block 210.

For example, the image interpolation method may obtain the horizontal compensation value $C_{H0}$ of a first row by respectively subtracting original pixel values $R_0$, $R_2$, and $R_4$ from the horizontal interpolation values $Gh_0$, $Gh_2$, and $Gh_4$, then summing-up the respectively subtracted values, and then dividing the summed-up value by 3 ($C_{H0}=(Gh_0-R_0+Gh_2-R_2+Gh_4-R_4)/3$).

Also, the image interpolation method may obtain the horizontal compensation value $C_{H1}$ of a second row by respectively subtracting original pixel values $B_6$ and $B_8$ from the horizontal interpolation values $Gh_6$ and $Gh_8$, then summing-up the respectively subtracted values, and then dividing the summed-up value by 2 ($C_{H1}=(Gh_6-B_6+Gh_8-B_8)/2$).

Also, the image interpolation method may obtain the horizontal compensation value $C_{H2}$ of a third row by respectively subtracting original pixel values $R_{10}$, $R_{12}$, and $R_{14}$ from the horizontal interpolation values $Gh_{10}$, $Gh_{12}$, and $Gh_{14}$, then summing-up the respectively subtracted values, and then dividing the summed-up value by 3 ($C_{H2}=(Gh_{H2}=(Gh_{10}-R_{10}+Gh_{12}-R_{12}+Gh_{14}-R_{14})/3$).

In this manner, the image interpolation method may obtain the horizontal compensation values $C_{H3}$ and $C_{H4}$ of fourth and fifth rows.

Next, in operation 240, the image interpolation method may add the calculated horizontal compensation values $C_{H0}$, $C_{H1}$, $C_{H2}$, $C_{H3}$, and $C_{H4}$ and the original pixel values (R or B) to obtain horizontal reference values $G_0$, $G_2$, $G_4$, ..., and $G_{24}$.

For example, the image interpolation method may obtain the horizontal reference values $G_0$, $G_2$, and $G_4$ of a first row by adding the horizontal compensation value $C_{H0}$ to original pixel values $R_0$, $R_2$, and $R_4$. That is, the image interpolation method may add the horizontal compensation value $C_{H0}$ to the original pixel $R_0$ value to calculate the horizontal reference value $G_0$ ($G_0=R_0+C_{H0}$), add the horizontal compensation value $C_{H0}$ to the original pixel value $R_2$ to calculate the horizontal reference value $G_2$ ($G_2=R_2+C_{H0}$), and add the horizontal compensation value $C_{H0}$ to the original pixel value $R_4$ to calculate the horizontal reference value $G_4$ ($G_4=R_4+C_{H0}$).

Also, the image interpolation method may obtain the horizontal reference value $G_6$ of a second row by adding the horizontal compensation value $C_{H1}$ to an original pixel value $B_6$ ($G_6=B_6+C_{H1}$), and obtain the horizontal reference value $G_8$ of the second row by adding the horizontal compensation value $C_{H1}$ to an original pixel value $B_8$ ($G_8=B_8+C_{H1}$).

In this manner, the image interpolation method may obtain the horizontal reference values $G_{10}$, $G_{12}$ ..., and $G_{24}$ of third, fourth, and fifth rows.

Consequently, the image interpolation method may enable the obtained horizontal reference values to correspond to the reference block 210 to thereby generate a horizontal reference block 250. Accordingly, the reference block 250 may have the horizontal reference value $G_0$ with respect to a pixel (for a pixel) (hereinafter, referred to as pixel '0') corresponding to '0', and have the horizontal reference value $G_1$ with respect to a pixel (for a pixel) (hereinafter, referred to as pixel '1') corresponding to '1'.

In this case, the image interpolation method may calculate horizontal dissimilarity values using the horizontal reference block 250. According to an embodiment, the image interpolation method may calculate difference values ($Gh_0 - G_0$) between the horizontal interpolation values $Gh_0$, $Gh_2$, and $Gh_4$ of the reference block 210 and horizontal reference values $G_0$, $G_1$, ..., and $G_{24}$ of the horizontal reference block 250 corresponding to the horizontal interpolation values, sum-up absolute values ($|Gh_0 - G_0|$) of the calculated difference values with respect to all pixels (for all pixels) of the horizontal reference block, and calculate the summed-up result as the horizontal dissimilarity values.

For example, the image interpolation method may calculate the difference value ($Gh_0 - G_0$) by subtracting the horizontal reference value $G_0$ from the horizontal interpolation value $Gh_0$, with respect to the pixel '0' (for the pixel '0') of the 5*5 horizontal reference block 250, and obtain the absolute value ($|Gh_0 - G_0|$) of the calculated difference value.

Also, the image interpolation method may calculate the difference value ($G_1 - G_1$) by subtracting the horizontal reference value $G_1$ from the original pixel value $G_1$, with respect to the pixel '1' (for the pixel '1'), and obtain an absolute value ($|G_1 - G_1|$) of the calculated difference value. In this case, the absolute value with respect to the pixel '1' (for the pixel '1') may be '0' corresponding to a difference between identical values.

Also, the image interpolation method may calculate a difference value ($Gh_2 - G_2$) by subtracting the horizontal reference value $G_2$ from the horizontal interpolation value $Gh_2$, with respect to a pixel (for a pixel) (hereinafter, referred to as pixel '2') corresponding to '2', and obtain an absolute value ($|Gh_2 - G_2|$) of the calculated difference value. In this manner, the image interpolation method may obtain absolute values with respect to all pixels (for all pixels) up to a pixel corresponding to '24' of which an absolute value is $|Gh_{24} - G_{24}|$.

Consequently, the image interpolation method may sum-up the respective absolute values of the calculated difference values with respect to the all pixels ('0' to '24') (for all pixels ('0' to '24') of the horizontal reference block 250 ($|Gh_0 - G_0| + |Gh_2 - G_2| + \ldots |Gh_{24} - G_{24}|$), and calculate the summed-up result as the horizontal dissimilarity values, that is, a Sum of Absolute Difference Horizontal (SADH).

Example of Generating Vertical (V) Reference Block

Figure 3:
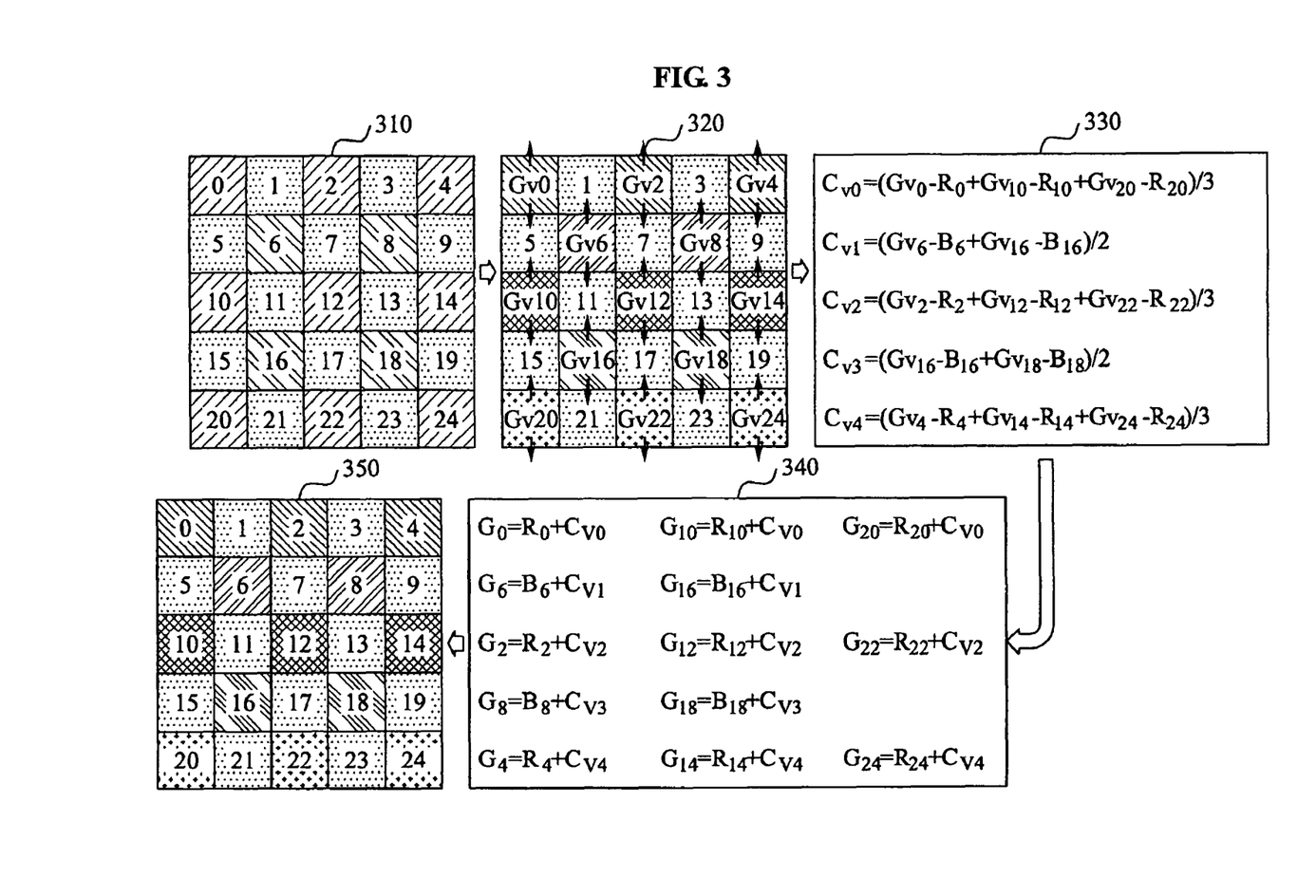
FIG. 3 illustrates an example of generating a vertical reference block according to an embodiment.

FIG. 3 illustrates an example of generating a vertical reference block according to an embodiment.

Referring to FIG. 3, the image interpolation method may designate a reference block 310 from the inputted image. For example, the reference block 310 may be a 5*5 block, and each of 25 pixels of the reference block 310 has an independent pixel value.

In operation 320, the image interpolation method may perform a temporary interpolation on the reference block 310 in a vertical direction to calculate vertical interpolation values $Gv_0$, $Gv_1$, $Gv_2$, ..., and $Gv_{24}$. In operation 330, the image interpolation method may calculate, as vertical compensation values $C_{V0}$, $C_{V1}$, $C_{V2}$, $C_{V3}$, and $C_{V4}$ for each column, an average between the calculated vertical interpolation values (Gv) and original pixel values (R or B) for each column of column 0, column 1, column 2, column 3, and column 4 of the reference block 310.

For example, the image interpolation method may obtain, in the same manner as that in the horizontal interpolation value, the vertical compensation value $C_{V0}$ of a first column by respectively subtracting original pixel values $R_0$, $R_{10}$, and $R_{20}$ from vertical interpolation values $Gv_0$, $Gv_{10}$, and $Gv_{20}$, then summing-up the respectively subtracted values, and then dividing the summed-up value by 3 ($C_{V0} = (Gv_0 - R_0 + Gv_{10} - R_{10} + Gv_{20} - R_{20})/3$).

Also, the image interpolation method may obtain the vertical compensation value $C_{V1}$ of a second column by respectively subtracting original pixel values $B_6$ and $B_{16}$ from vertical interpolation values $Gv_6$ and $Gv_{16}$, then summing-up the respectively subtracted values, and then dividing the summed-up value by 2 ($C_{V1} = (Gv_6 - B_6 + Gv_{16} - B_{16})/2$).

Also, the image interpolation method may obtain the vertical compensation value $C_{V2}$ of a third column by respectively subtracting original pixel values $R_2$, $R_{12}$, and $R_{22}$ from vertical interpolation values $Gv_2$, $Gv_{12}$, and $Gv_{22}$, then summing-up the respectively subtracted values, and then dividing the summed-up value by 3 ($C_{V2} = (Gv_2 - R_2 + Gv_{12} - R_{12} + Gv_{22} - R_{22})/3$).

In this manner, the image interpolation method may obtain the vertical compensation values $Cv_3$ and $Cv_4$ of fourth and fifth columns.

Next, in operation 340, the image interpolation method may add the calculated vertical compensation values $C_{V0}$, $C_{V1}$, $C_{V2}$, $C_{V3}$, and $C_{V4}$ to the original pixel values (R or B) to obtain vertical reference values $G_0$, $G_2$, $G_4$, ..., and $G_{24}$.

For example, the image interpolation method may obtain the vertical reference values $G_0$, $G_{10}$, and $G_{20}$ of a first column by adding the vertical compensation value $C_{V0}$ to original pixel values $R_0$, $R_{10}$, and $R_{20}$. That is, the image interpolation method may add the vertical compensation value $C_{V0}$ to the original pixel $R_0$ to calculate the vertical reference value $G_0$ ($G_0 = R_0 + C_{V0}$), add the vertical compensation value $C_{V0}$ to the original pixel value $R_{10}$ to calculate the vertical reference value $G_{10}$ ($G_{10} = R_{10} + C_{V0}$), and add the vertical compensation value $C_{V0}$ to the original pixel value $R_{20}$ to calculate the vertical reference value $G_{20}$ ($G_{20} = R_{20} + C_{V0}$).

Also, the image interpolation method may obtain the vertical reference value $G_6$ of a second column by adding the vertical compensation value $C_{V1}$ to an original pixel value $B_6$ ($G_6 = B_6 + C_{V1}$), and obtain the vertical reference value $G_{16}$ of the second column by adding the horizontal compensation value $C_{V1}$ to an original pixel value $B_{16}$ ($G_{16} = B_{16} + C_{V1}$).

In this manner, the image interpolation method may obtain the vertical reference values $G_2$, $G_{12}$, ..., and $G_{24}$ of third, fourth, and fifth columns.

Consequently, the image interpolation method may enable the obtained vertical reference values to correspond to the reference block 310 to thereby generate a vertical reference block 350.

The image interpolation method may calculate a vertical dissimilarity value using the vertical reference block 350. According to an embodiment, the image interpolation method may calculate difference values ($Gv_0 - G_0$) between the vertical interpolation values $Gv_0$, $Gv_{10}$, and $Gv_{20}$ of the reference block 310 and vertical reference values $G_0$, $G_1$, ..., and $G_{24}$ of the vertical reference block 350 corresponding to the vertical interpolation values, sum-up absolute values ($|(Gv_0 - G_0)|$) of the calculated difference values with respect to all pixels (for all pixels) of the vertical reference block, and calculate the summed-up result as the vertical dissimilarity values.

For example, the image interpolation method may calculate the difference value ($Gv_0-G_0$) by subtracting the vertical reference value $G_0$ from the vertical interpolation value $Gv_0$, with respect to a pixel '0' (for a pixel '0') of the 5*5 vertical reference block 350, and obtain the absolute value ($|(Gv_0-G_0)|$) of the calculated difference value.

Also, the image interpolation method may calculate the difference value ($G_1-G_1$) by subtracting the vertical reference value $G_1$ from the original pixel value $G_1$, with respect to the pixel '1' (for the pixel '1'), and obtain an absolute value ($|G_1-G_1|$) of the calculated difference value. In this case, the absolute value with respect to the pixel '1' (for the pixel '1') may be '0' corresponding to a difference between identical values.

Also, the image interpolation method may calculate a difference value ($Gv_2-G_2$) by subtracting the vertical reference value $G_2$ from the vertical interpolation value $Gv_2$, with respect to a pixel '2' (for the pixel '2'), and obtain an absolute value ($|Gv_2-G_2|$) of the calculated difference value. In this manner, the image interpolation method may obtain absolute values with respect to all pixels (for all pixels) up to a pixel '24' of which an absolute value is $|Gv_{24}-G_{24}|$.

Consequently, the image interpolation method may sum-up the respective absolute values of the calculated difference values with respect to the all pixels ('0' to '24') (for all pixels ('0' to '24') of the vertical reference block 350 ($|Gv_0-G_0|+|Gv_2-G_2|+\ldots+|Gv_{24}-G_{24}|$), and calculate the summed-up result as the vertical dissimilarity values, that is, a Sum of Absolute Difference Vertical (SADV).

In operation 180 of FIG. 1, the image interpolation method may determine interpolation directivity with respect to the inputted image (for the inputted image) using the calculated horizontal dissimilarity values and vertical dissimilarity values. For example, in operations 181 and 182 of FIG. 1, the image interpolation method may determine, as the interpolation directivity, a direction having a smallest dissimilarity value from among the horizontal dissimilarity value and the vertical dissimilarity value.

In operation 190 of FIG. 1, the image interpolation method may perform a color filter array (CFA) interpolation on the inputted image depending on the determined interpolation directivity.

FIGS. 4A, 4B, 5A, and 5B illustrate a difference between images interpolated in accordance with a conventional method (4A and 5A) and the present disclosure (4B and 5B).

Figure 4A:
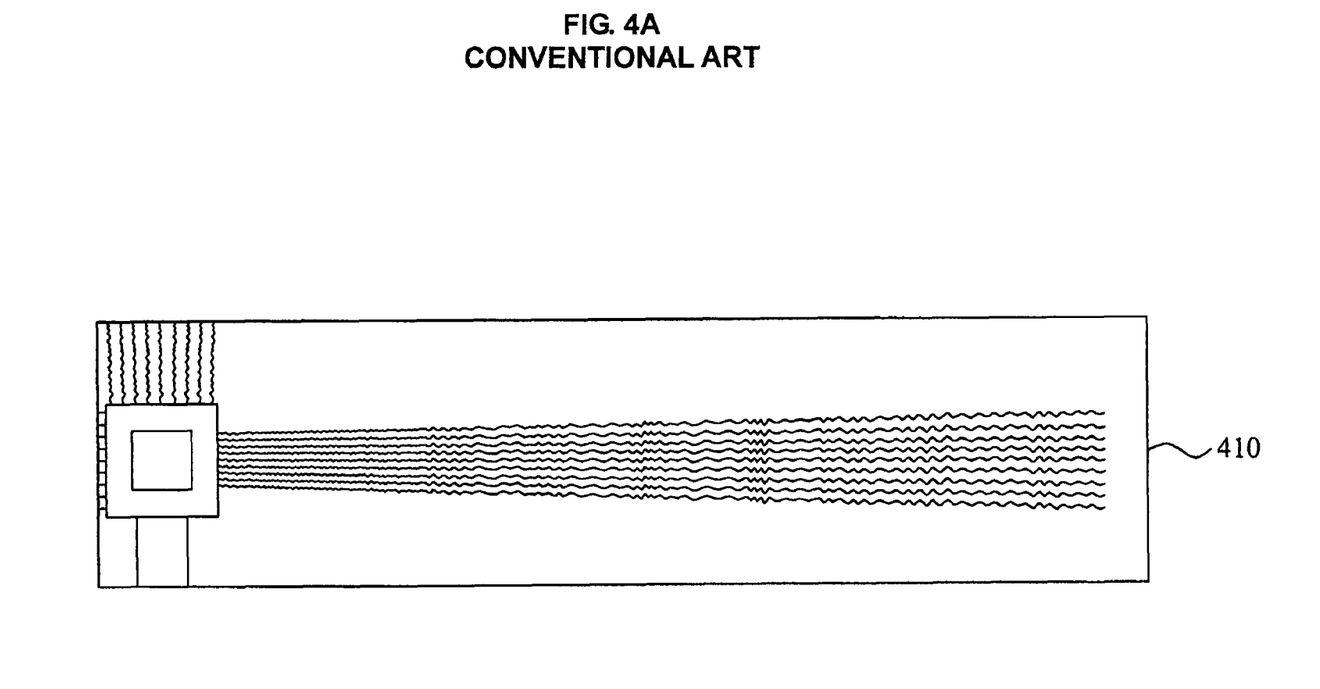
FIGS. 4A, 4B, 5A, and 5B illustrate a difference between images interpolated in accordance with a conventional method (4A and 5A) and the present disclosure (4B and 5B)
Figure 4B:
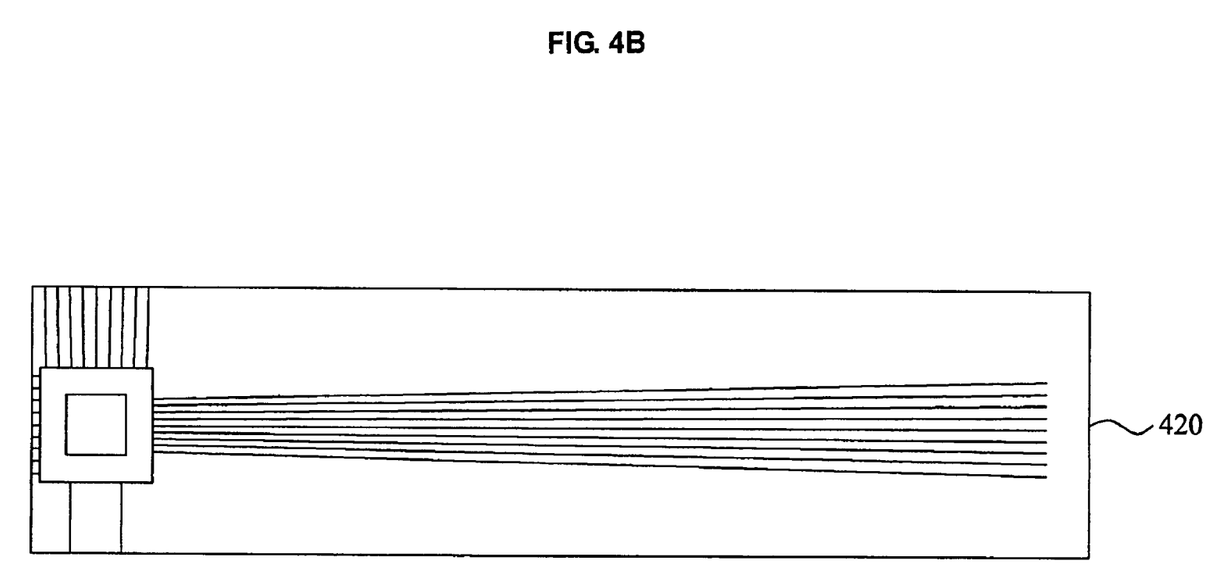

Referring to FIGS. 4A and 4B, in a conventional interpolation image 410 (FIG. 4A), a defect such as a zipper artifact may occur compared with an interpolation image 420 of the present disclosure (FIG. 4B). The zipper artifact may occur when a high spatial correlation characteristic is not appropriately utilized in a CFA interpolation algorithm.

Figure 5A:
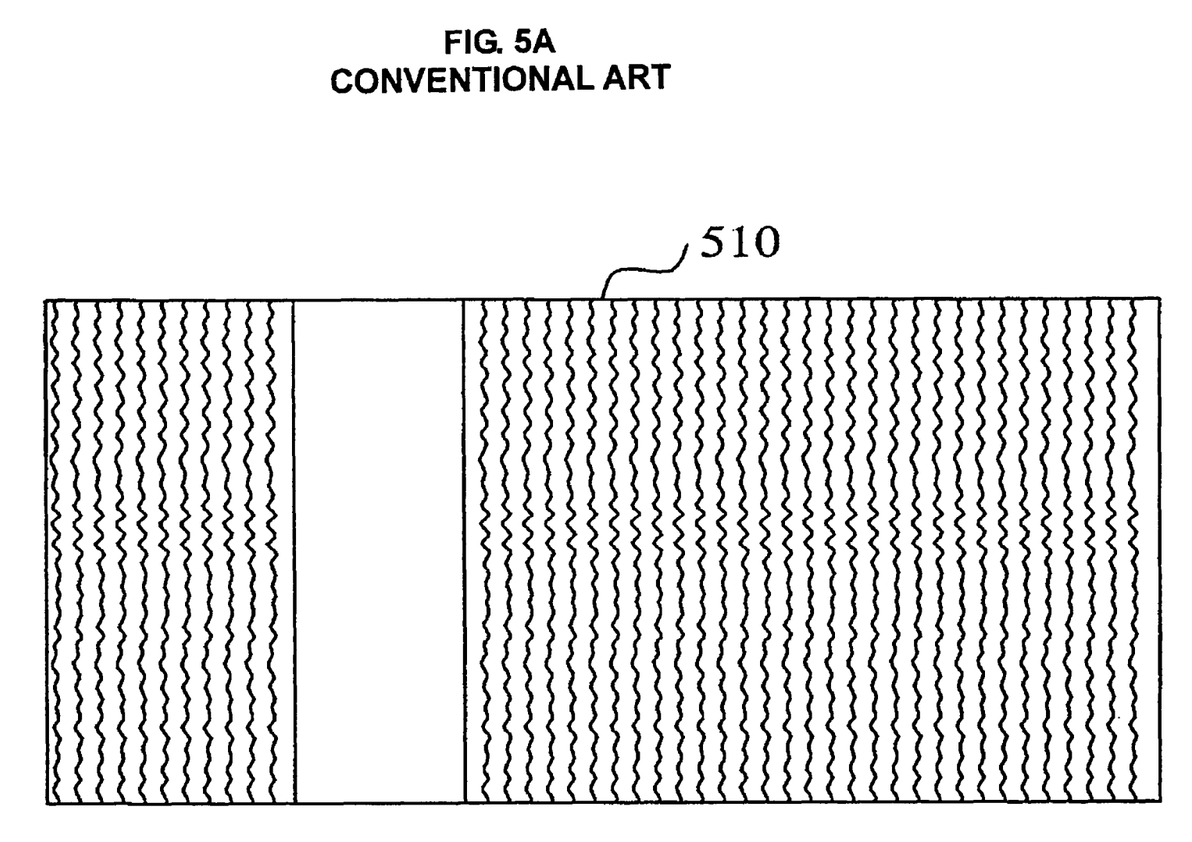
Figure 5B:
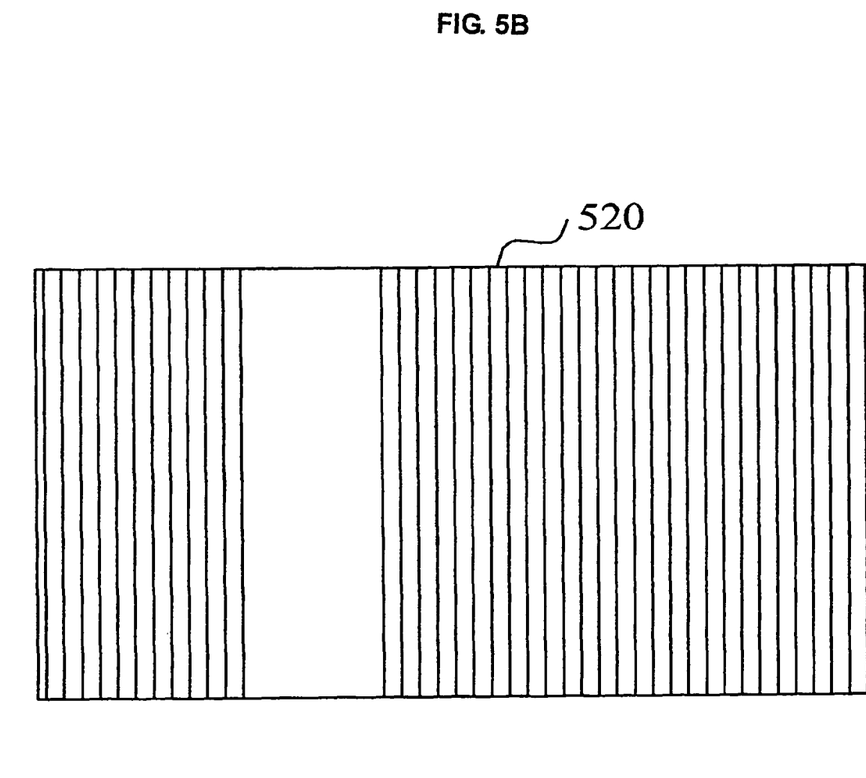

Similarly, in FIGS. 5A and 5B, in a conventional interpolation image 510 (FIG. 5A), a defect such as the zipper artifact may occur compared with an interpolation image 520 of the present disclosure (FIG. 5B). Also, although not illustrated, when a high spectral correlation characteristic is not appropriately utilized in the CFA interpolation algorithm, a defect such as false color may occur. However, according to the present disclosure, the interpolation directivity may be more accurately estimated and determined when an edge is relatively small and thus, the defects such as the zipper artifact or the false color, which are induced due to errors occurring when estimating the interpolation directivity, may be reduced.

Figure 6:
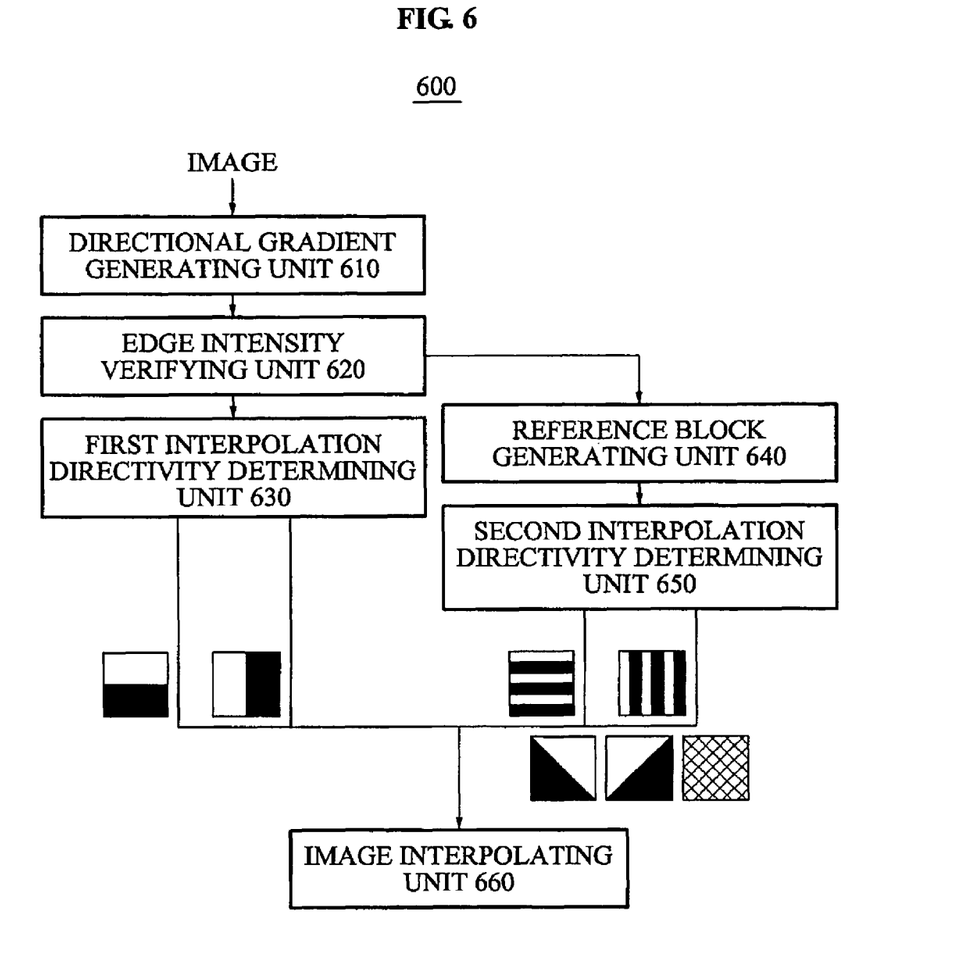
FIG. 6 is a block diagram illustrating an image interpolation apparatus according to an embodiment.

FIG. 6 is a block diagram illustrating an image interpolation apparatus 600 according to an embodiment.

Referring to FIG. 6, the image interpolation apparatus 600 includes a directional gradient generating unit 610, an edge intensity verifying unit 620, a first interpolation directivity determining unit 630, a reference block generating unit 640, a second interpolation directivity determining unit 650, and an image interpolating unit 660.

The directional gradient generating unit 610 may calculate a horizontal gradient and a vertical gradient each with respect to an inputted image (for an inputted image) (Bayer pattern image).

The edge intensity verifying unit 620 may verify an edge intensity of the inputted image. For example, when the edge intensity is greater than or equal to a predetermined threshold, the edge intensity verifying unit 620 may verify whether the edge direction is a vertical direction or a horizontal direction to inform the first interpolation directivity determining unit 630 of the verified result. Otherwise, when the edge intensity is smaller than the threshold, the edge intensity verifying unit 620 may instruct the reference block generating unit 640 to generate a horizontal reference block and a vertical reference block to more accurately predict the interpolation directivity.

The reference block generating unit 640 may designate a reference block from the inputted image, calculate a horizontal interpolation value by performing a temporary interpolation on the designated reference block in a horizontal direction, calculate, as a horizontal compensation value, an average between the calculated horizontal interpolation value for each row of the reference block and an original pixel value, calculate a horizontal reference value by adding the calculated horizontal compensation value and the original pixel value, and generate the horizontal reference block by enabling the calculated horizontal reference value to correspond to the reference block.

Also, the reference block generating unit 640 may calculate a vertical interpolation value by performing a temporary interpolation on the designated reference block in a vertical direction, calculate, as a vertical compensation value, an average between the calculated vertical interpolation value for each column of the reference block and an original pixel value, calculate a vertical reference value by adding the calculated vertical compensation value and the original pixel value, and generate the vertical reference block by enabling the calculated vertical reference value to correspond to the reference block.

The second interpolation directivity determining unit 650 may determine the interpolation directivity with respect to the image (for the image) using the generated horizontal reference block and vertical reference block. For example, the second interpolation directivity determining unit 650 may calculate a horizontal dissimilarity value using the generated horizontal reference block, calculate a vertical dissimilarity value using the generated vertical reference block, and determine, as the interpolation directivity, a direction having a smallest dissimilarity value from among the horizontal dissimilarity value and the vertical dissimilarity value.

The image interpolating unit 660 may perform a CFA interpolation on the image based on the determined interpolation directivity.

Descriptions of FIGS. 1 to 5 may be applicable in the image interpolation apparatus of FIG. 6, and thus further descriptions of FIG. 6 will be omitted.

The above described image interpolation method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. An image interpolation method, comprising:
   generating a horizontal reference block for an inputted image;
   generating a vertical reference block for the inputted image; and
   determining interpolation directivity for the inputted image using the generated horizontal reference block and vertical reference block,
   wherein the method is performed using at least one processor.

2. The image interpolation method of claim 1, wherein the generating of the horizontal reference block comprises:
   designating a reference block from the inputted image;
   calculating a horizontal compensation value for each row of the designated reference block;
   calculating a horizontal reference value by adding the calculated horizontal compensation value and an original pixel value; and
   generating the horizontal reference block by enabling the calculated horizontal reference value to correspond to the reference block.

3. The image interpolation method of claim 2, wherein the calculating of the horizontal compensation value comprises:
   calculating a horizontal interpolation value by performing a temporary interpolation on the designated reference block in a horizontal direction;
   calculating an average between the calculated horizontal interpolation value for each row of the reference block and the original pixel value; and
   designating the calculated average as the horizontal compensation value for each row of the reference block.

4. The image interpolation method of claim 2, further comprising:
   calculating a difference value between the horizontal interpolation value of the reference block and a horizontal reference value of the horizontal reference block corresponding to the horizontal interpolation value;
   summing-up an absolute value of the calculated difference value for all pixels of the horizontal reference block; and
   designating the summed-up result value as a horizontal dissimilarity value.

5. The image interpolation method of claim 1, wherein the generating of the vertical reference block comprises:
   designating a reference block from the inputted image;
   calculating a vertical compensation value for each column of the designated reference block;
   calculating a vertical reference value by adding the calculated vertical compensation value and an original pixel value; and
   generating the vertical reference block by enabling the calculated vertical reference value to correspond to the reference block.

6. The image interpolation method of claim 5, wherein the calculating of the vertical compensation value comprises:
   calculating a vertical interpolation value by performing a temporary interpolation on the designated reference block in a vertical direction;
   calculating an average between the calculated horizontal interpolation value for each column of the reference block and the original pixel value; and
   designating the calculated average as the vertical compensation value for each column of the reference block.

7. The image interpolation method of claim 5, further comprising:
   calculating a difference value between the vertical interpolation value of the reference block and a vertical reference value of the vertical reference block corresponding to the vertical interpolation value;
   summing-up an absolute value of the calculated difference value for all pixels of the vertical reference block; and
   designating the summed-up result value as a vertical dissimilarity value.

8. The image interpolation method of claim 1, wherein the determining of the interpolation directional property comprises:
   calculating a horizontal dissimilarity value using the generated horizontal reference block;
   calculating a vertical dissimilarity value using the generated vertical reference block; and
   determining, as the interpolation directivity, a direction having a smallest dissimilarity value from among the horizontal dissimilarity value and the vertical dissimilarity value.

9. The image interpolation method of claim 1, further comprising:
   performing a color filter array (CFA) interpolation on the inputted image in accordance with the determined interpolation directivity.

10. At least one non-transitory computer-readable medium comprising computer readable instructions implementing the method of claim 1.

11. An image interpolation method, comprising:
    determining whether to verify interpolation directivity depending on an edge intensity of an inputted image;
    calculating a degree of direction dissimilarity of a reference block when being determined to verify the interpolation directivity; and
    predicting the interpolation directivity for the inputted image based on the direction of direction dissimilarity of the reference block, wherein the method is performed using at least one processor.

12. The image interpolation method of claim 11, wherein the determining of whether to verify the interpolation directivity comprises:
performing a color filter array (CFA) interpolation on the inputted image in accordance with an edge direction without verifying the interpolation directivity, when the edge intensity is greater than a predetermined threshold.

13. The image interpolation method of claim 11, wherein the calculating of the degree of direction dissimilarity of the reference block comprises:
generating a horizontal reference block by performing a temporary interpolation, in a horizontal direction, on a reference block designated from the inputted image;
generating a vertical reference block by performing a temporary interpolation, in a vertical direction, on the designated reference block; and
calculating the degree of direction dissimilarity of the reference block based on the generated horizontal reference block and vertical reference block.

14. The image interpolation method of claim 13, wherein the predicting of the interpolation directivity comprises:
calculating a horizontal dissimilarity value using the generated horizontal reference block;
calculating a vertical dissimilarity value using the generated vertical reference block; and
predicting, as the interpolation directivity, a direction having a smallest dissimilarity value from among the horizontal dissimilarity value and the vertical dissimilarity value.

15. An image interpolation apparatus, comprising:
an edge intensity verifying unit to verify an edge intensity of an inputted image;
a reference block generating unit to generate a horizontal reference block and a vertical reference block for the inputted image based on the verified result; and
an interpolation directivity determining unit to determine an interpolation directivity for the inputted image using the generated horizontal reference block and vertical direction reference block using at least one processor.

16. The image interpolation apparatus of claim 15, wherein the reference block generating unit designates a reference block from the inputted image, calculates a horizontal interpolation value by performing a temporary interpolation on the designated reference block in a horizontal direction, calculates, as a horizontal compensation value, an average between the calculated horizontal interpolation value for each row of the reference block and an original pixel value, calculates a horizontal reference value by adding the calculated horizontal compensation value and the original pixel value, and generates the horizontal reference block by enabling the calculated horizontal reference value to correspond to the reference block.

17. The image interpolation apparatus of claim 15, wherein the reference block generating unit designates a reference block from the inputted image, calculates a vertical interpolation value by performing a temporary interpolation on the designated reference block in a vertical direction, calculates, as a vertical compensation value, an average between the calculated vertical interpolation value for each column of the reference block and an original pixel value, calculates a vertical reference value by adding the calculated vertical compensation value and the original pixel value, and generates the vertical reference block by enabling the calculated vertical reference value to correspond to the reference block.

18. The image interpolation apparatus of claim 15, wherein the interpolation directivity determining unit calculates a horizontal dissimilarity value using the generated horizontal reference block, calculates a vertical dissimilarity value using the generated vertical reference block, and determines, as the interpolation directivity, a direction having a smallest dissimilarity value from among the horizontal dissimilarity value and the vertical dissimilarity value.

19. The image interpolation apparatus of claim 15, further comprising:
an image interpolating unit to perform a CFA interpolation on the inputted image based on the determined interpolation directivity.

* * * * *